United States Patent
Al-Mehthel et al.

(10) Patent No.: US 10,407,557 B2
(45) Date of Patent: *Sep. 10, 2019

(54) SULFUR EXTENDED ASPHALT MODIFIED WITH CRUMB RUBBER FOR PAVING AND ROOFING

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Mohammad Anwar Parvez, Dhahran (SA); Hamad I. Al-Abdul Wahhab, Dhahran (SA); Ibnelwaleed A. Hussein, Dhahran (SA); Saleh H. Al-Idi, Dhahran (SA)

(73) Assignees: Saudi Arabian Oil Company, Dhahran (SA); King Fahd University of Petroleum and Minerals, Dhahran (SA)

(*) Notice: Subject to any disclaimer, the term of this patent is extended or adjusted under 35 U.S.C. 154(b) by 96 days.

This patent is subject to a terminal disclaimer.

(21) Appl. No.: 15/664,850

(22) Filed: Jul. 31, 2017

(65) Prior Publication Data

US 2017/0327664 A1 Nov. 16, 2017

Related U.S. Application Data

(60) Continuation-in-part of application No. 14/873,759, filed on Oct. 2, 2015, which is a division of application No. 13/966,571, filed on Aug. 14, 2013, now Pat. No. 9,181,435.

(51) Int. Cl.

| | | |
|---|---|---|
| C08K 3/06 | (2006.01) | |
| C08L 47/00 | (2006.01) | |
| C08L 95/00 | (2006.01) | |
| C08L 21/00 | (2006.01) | |
| C09D 195/00 | (2006.01) | |
| C09D 147/00 | (2006.01) | |
| C08L 17/00 | (2006.01) | |

(52) U.S. Cl.
CPC .......... C08K 3/06 (2013.01); C08L 17/00 (2013.01); C08L 21/00 (2013.01); C08L 47/00 (2013.01); C08L 95/00 (2013.01); C09D 147/00 (2013.01); C09D 195/00 (2013.01); C08L 2555/22 (2013.01); C08L 2555/34 (2013.01); C08L 2555/54 (2013.01); C08L 2555/80 (2013.01)

(58) Field of Classification Search
CPC .............. C08L 2555/54; C08L 2555/80
See application file for complete search history.

(56) References Cited

U.S. PATENT DOCUMENTS

| | | |
|---|---|---|
| 5,719,215 A | 2/1998 | Liang et al. |
| 5,851,276 A | 12/1998 | Memon |
| 5,936,015 A | 8/1999 | Burns |
| 5,938,832 A | 8/1999 | Memon |
| 5,959,007 A | 9/1999 | Liang |
| 6,387,965 B1 | 5/2002 | Benko et al. |
| 6,478,951 B1 | 11/2002 | Labib et al. |
| 7,074,846 B2 | 7/2006 | Sylvester et al. |
| 7,087,665 B2 | 8/2006 | Sylvester et al. |
| 7,417,082 B2 | 8/2008 | Martin |
| 8,198,350 B2 | 6/2012 | Fee et al. |
| 2007/0249762 A1 | 10/2007 | Sylvester |
| 2008/0015287 A1 | 1/2008 | Butler et al. |
| 2009/0054562 A1 | 2/2009 | Martin |
| 2011/0015313 A1 | 1/2011 | Martin |
| 2011/0196073 A1 | 8/2011 | Fee et al. |
| 2012/0022182 A1* | 1/2012 | Ranka ............... C08J 3/075 523/351 |

FOREIGN PATENT DOCUMENTS

| | | |
|---|---|---|
| EP | 2055745 A1 | 5/2009 |
| WO | 199027018 A1 | 6/1999 |
| WO | 2011104251 A1 | 9/2011 |

OTHER PUBLICATIONS

International Search Report and Written Opinion for related PCT application PCT/US2014/050028, dated Oct. 20, 2014.
Neutag et al., "Performance of Crumb Rubber Modified Binders and Asphalt", 5th International Conference "Bituminous Mixtures and Pavements", 2011, (Abstract) 1 page.
Nicholls, "Shell Thiopave Sulphur Extended Asphalt Modifier", 5th International Conference "Bituminous Mixtures and Pavements", 2011, (Abstract) 1 page.
Parvez et al., "Utilization of Sulfur and Crumb Rubber in Asphalt Modification", Journal of Applied Polymer Science, 2014, 11 pages, Wiley Periodicals Inc.
Taman et al., "Utilisation of Sulphur and Rubber in Modifying Asphalt Binders (Bitumens) for Road Materials", Asphalt Technology, 1991, pp. 61-66, vol. 41, XP009180714.
"Strategic Highway Research Program (SHRP) method AASHTO MP1-98", Jan. 1994, pp. 1-4.

* cited by examiner

*Primary Examiner* — Wenwen Cai
(74) *Attorney, Agent, or Firm* — Bracewell LLP; Constance G. Rhebergen; Linda L. Morgan

(57) ABSTRACT

The present invention relates to asphalt compositions. The present invention provides for a sulfur rubber asphalt binder composition that includes a base asphalt having a softening point, elemental sulfur, and a recycled crumb rubber material. The crumb rubber material is combined with the base asphalt and the elemental sulfur to create the sulfur rubber asphalt binder composition. The crumb rubber material is present in the sulfur rubber asphalt binder in an amount effective to increase the softening point as compared to the softening point of the base asphalt.

14 Claims, 2 Drawing Sheets

SULFUR EXTENDED ASPHALT MODIFIED WITH CRUMB RUBBER FOR PAVING AND ROOFING

RELATED APPLICATIONS

The present application is a continuation in part application of U.S. patent application Ser. No. 14/873,759, filed Oct. 2, 2015, which is a divisional application of U.S. patent application Ser. No. 13/966,571, filed Aug. 14, 2013, now U.S. Pat. No. 9,181,435, the disclosure of each of which is incorporated herein by reference in its entirety.

FIELD OF THE INVENTION

The present invention relates to asphalt compositions. More specifically, the invention relates to asphalt binder compositions including asphalt, elemental sulfur, and crumb rubber, and methods of making the same.

BACKGROUND OF THE INVENTION

As modern commerce depends on reliable and cost-effective methods for delivering products from suppliers to users, the availability of durable and reliable highways, roads, and other support surfaces for vehicles is vital for sustaining a modern economy. To provide better support surfaces, highways, roads, and sidewalks are commonly paved with a layer or mat of asphaltic concrete that is laid over the surface of the sub-base. Asphalt is preferred over cement to pour roads because it is less expensive and very durable. Asphalt can also be poured at night, which allows major roads to be shut down at the least busy of times for maintenance. Relative to road noise, asphalt is also quieter than cement, making it the better choice for roads.

Asphalts are essentially mixtures of bitumen, as binder, with aggregate, in particular filler, sand, and stones. There are many different types of asphalts available and their characteristics can vary quite significantly. The design of asphalts for bituminous paving applications is a complex process of selecting and proportioning materials to obtain the desired properties in the finished construction while minimizing undesirable characteristics.

In evaluating and adjusting mix designs, the aggregate gradation and the binder content in the final mix design are balanced between the stability and durability requirements for the intended use. The final goal of a mix design is to achieve a balance among all of the desired properties. Many binders and various polymers have been investigated for reaching similar goals, and other modifications have been studied.

Unsaturated thermoplastic elastomers like styrene-butadiene-styrene (SBS) block copolymers are polymers used for asphalt modification. These polymers enhance the elastic recovery capacities of asphalt and, therefore, its resistance to permanent deformations. However, unsaturated elastomeric polymers are quite expensive and are subject to degradation when exposed to atmospheric agents and mechanical stress. Due to their fragility, they are typically used as virgin polymers, which can result in significant cost increases for the product. While SBS is recognized for its performance benefits, research has focused on more cost effective modifiers in exchange for sacrificing superior performance.

Olefinic polymers have been investigated for use as modifiers. They are available in large quantities with different mechanical properties and at low cost. Polyethylene (PE) and polypropylene (PP) are plastomers. They impart high rigidity (i.e., lack of elasticity, resistance to bending) to the product and significantly reduce deformations under traffic load. Due to their non-polar nature, PE and PP are almost completely immiscible with asphalt, and are thus limited in use.

Conventional asphalts often do not retain sufficient elasticity in commercial use and exhibit plasticity ranges which are too narrow for use in many modern applications, such as road construction. The characteristics of road asphalts can be improved by incorporating an elastomeric-type polymer. There exists a wide variety of polymers that can be mixed with asphalt, with SBS being a commonly used polymer in asphalt modification. The resulting modified asphalts are commonly referred to as bitumen/polymer binders or asphalt/polymer mixes. There is a need for hot mix asphalt concrete modifiers that would increase resistance to permanent deformation while maintaining or increasing the modulus of the mix at intermediate temperatures without significantly affecting the binder properties.

The bituminous binders, including the bitumen/polymer type, presently employed in road applications often do not have optimal characteristics at low enough polymer concentrations to consistently meet the increasing structural and workability requirements imposed on roadway structures and their construction. In order to achieve a given level of modified asphalt performance, various polymers are added at some prescribed concentration. The current practice is to add the desired level of a single polymer, sometimes along with a reactant which promotes cross-linking of the polymer molecules until the desired asphalt properties are met. The reactant is typically sulfur in a form suitable for reacting.

When added to bitumen at 140° C., sulfur is finely dispersed in bitumen as uniformly small particles, with coagulation and settlement of the sulfur particles becoming noticeable after a few hours. Therefore, the sulfur extended asphalt (SEA) mixtures can be produced directly in the mixing plant just before the laying of the asphalt mixture. One major concern in handling sulfur-asphalt mix is the fear of the evolution of hazardous hydrogen sulfide ($H_2S$) during production and laying. This problem can be ameliorated by adding carbon or ash to sulfur. $H_2S$ evolution starts at temperatures higher than 150° C., so that the application of the asphalt mixture at temperatures up to 150° C. avoids pollution and safety problems. However, $H_2S$ evolution starts well below 150° C., i.e. about 130° C., which is undesirable from an environmental perspective. Moreover, below 120° C., neither the reaction of the asphalt and sulfur nor the cross-linking of the SBS/sulfur blend could take place.

Besides the performance and environmental issues associated with many types of asphalt modifiers, many of the polymers that are used to modify asphalt compositions are expensive and can be difficult to obtain in remote areas of the world.

A need therefore exists for a filler that can be used in asphalt compositions. Historically, limestone powder, limestone dust, and cement dust have been used as filler.

SUMMARY OF THE INVENTION

The present invention relates to asphalt compositions. More specifically, the invention relates to asphalt binder compositions including asphalt, elemental sulfur, and crumb rubber, and methods of making the same.

In some embodiments, the invention provides for a sulfur rubber asphalt binder composition that includes a base asphalt having a softening point, elemental sulfur, and a crumb rubber material, the crumb rubber including a recycled material. The crumb rubber material is combined with the base asphalt and the elemental sulfur to create the sulfur rubber asphalt binder composition. The crumb rubber material is present in the sulfur rubber asphalt binder in an amount effective to increase the softening point as compared to the softening point of the base asphalt.

In further embodiments, the invention provides for using the sulfur rubber asphalt binder composition to make an asphalt composition that also includes an aggregate material and a filler.

In additional embodiments, the invention provides for a method of making the sulfur rubber asphalt binder composition. The crumb rubber material is mixed with the base asphalt at a first predetermined temperature in a high shear blender for a first predetermined amount of time to create an asphalt crumb rubber mixture. The asphalt crumb rubber mixture is then placed in a sealed container in an oven at the first predetermined temperature for a second predetermined amount of time. The elemental sulfur is added to the asphalt crumb rubber mixture and mixed for a third predetermined amount of time at a second predetermined temperature such that intimate mixing of the elemental sulfur and the asphalt crumb mixture is achieved. In some embodiments, the asphalt is about 58% by weight, the elemental sulfur is about 40% by weight and the crumb rubber material is about 2% by weight.

DETAILED DESCRIPTION OF THE INVENTION

Although the following detailed description contains many specific details for purposes of illustration, it is understood that one of ordinary skill in the art will appreciate that many examples, variations, and alterations to the following details are within the scope and spirit of the invention. Accordingly, the exemplary embodiments of the invention described herein and provided in the appended figures are set forth without any loss of generality, and without imposing limitations, on the claimed invention.

In some embodiments, the invention provides for a sulfur rubber asphalt binder composition that includes a base asphalt having a softening point, elemental sulfur, and a crumb rubber material. The crumb rubber material is combined with the base asphalt and the elemental sulfur to create the sulfur rubber asphalt binder composition. The crumb rubber material is present in the sulfur rubber asphalt binder in an amount effective to increase the softening point as compared to the softening point of the base asphalt.

As is understood in the art, "crumb rubber" refers to a material that is a byproduct of tire retreading and scrapping. Therefore the crumb rubber is a recycled material derived from a waste product rather than a newly manufactured material, which reduces the overall cost of the sulfur rubber asphalt binder composition compared to compositions that use a newly manufactured virgin polymer. As an example, unsaturated polymers can degrade when exposed to atmospheric agents and mechanical stress and therefore due to their fragility, are typically as expensive virgin polymers. In certain embodiments, the crumb rubber can be free of virgin polymers.

Figure 2:
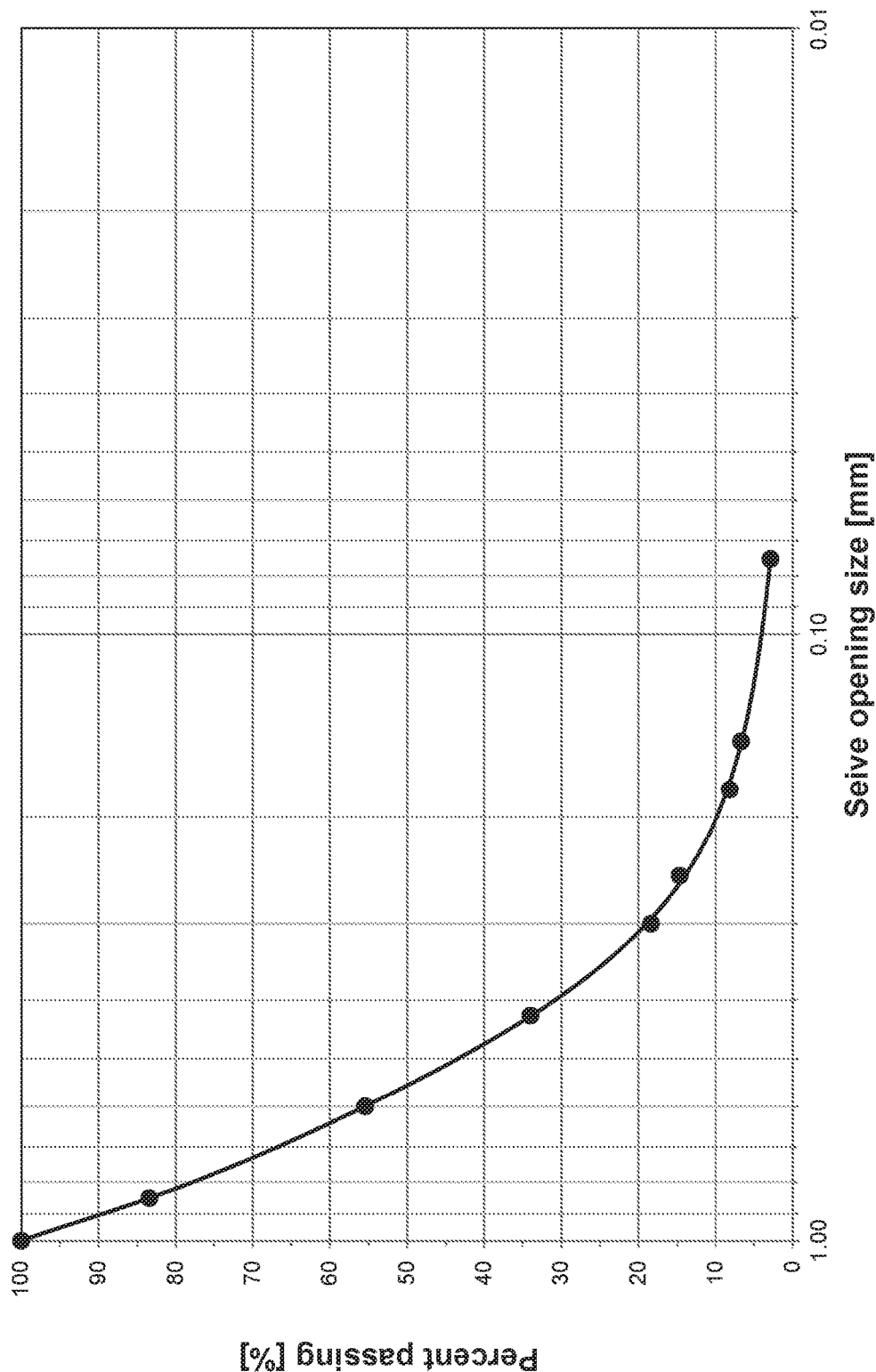
FIG. 2 shows an example crumb rubber particles size distribution.

In an example embodiment, the source of the used rubber used to form the crumb rubber can be waste car tires. The rubber from the car tires can be ground to fine powder to increase the surface area. The crumb rubber gradation can be determined using ASTM D5644 procedure. The maximum size of the crumb rubber can be 1 mm. The sieving results of such crumb rubber can be as shown in FIG. 2.

Due to the properties of the recycled waste tires, the resulting crumb rubber can include more than 20% carbon black and other additives, meaning that the elements that make up the polymer component of the crumb rubber total less than 80%. In comparison, as an example, styrene-butadiene-styrene (SBS) is known to have at least 90% mol of styrene. Because of the difference in composition between crumb rubber and SBS, in order to achieve the same level of performance, such as in terms of softening point, breaking point, and viscosity, the concentration of crumb rubber in the binder composition would have to be higher compared to the concentration of SBS if SBS was instead used instead. However, because crumb rubber is a more cost effective recycled product, even when using a higher amount of crumb rubber in the composition, the overall cost of the composition will be lower when using a crumb rubber compared to using an SBS. Embodiments of this disclosure can be free of an unsaturated thermoplastic elastomers, such as for example, free of an SBS, In some embodiments, the sulfur rubber asphalt binder composition ranges from about 45% by weight to 80% by weight base asphalt. In some embodiments, the composition ranges from about 55% by weight to 75% by weight base asphalt. In some embodiments, the composition is about 45% by weight base asphalt. In some embodiments, the composition is about 50% by weight base asphalt. In some embodiments, the composition is about 55% by weight base asphalt. In some embodiments, the composition is about 60% by weight base asphalt. In some embodiments, the composition is about 65% by weight base asphalt. In some embodiments, the composition is about 70% by weight base asphalt. In some embodiments, the composition is about 75% by weight base asphalt. In some embodiments, the composition is about 80% by weight base asphalt.

In further embodiments, the sulfur rubber asphalt binder composition ranges from about 10% by weight to 50% by weight elemental sulfur. In further embodiments, the elemental sulfur is up to 50% by weight. In further embodiments, the sulfur rubber asphalt binder composition is about 5% by weight elemental sulfur. In further embodiments, the sulfur rubber asphalt binder composition is about 10% by weight elemental sulfur. In further embodiments, the sulfur rubber asphalt binder composition is about 15% by weight elemental sulfur. In further embodiments, the sulfur rubber asphalt binder composition is about 20% by weight elemental sulfur. In further embodiments, the sulfur rubber asphalt binder composition is about 25% by weight elemental sulfur. In further embodiments, the sulfur rubber asphalt binder composition is about 30% by weight elemental sulfur. In further embodiments, the sulfur rubber asphalt binder composition is about 35% by weight elemental sulfur. In further embodiments, the sulfur rubber asphalt binder composition is about 40% by weight elemental sulfur. In further embodiments, the sulfur rubber asphalt binder composition is about 45% by weight elemental sulfur. In further embodiments, the sulfur rubber asphalt binder composition is about 50% by weight elemental sulfur. In further embodiments, the elemental sulfur is in solid form. In some embodiments, the elemental sulfur is in powder form. In other embodiments, the sulfur is in liquid form.

In further embodiments, the sulfur rubber asphalt binder composition ranges from about 1% by weight to 6% by weight crumb rubber material. In further embodiments, the sulfur rubber asphalt binder composition is about 1% by weight crumb rubber material. In further embodiments, the sulfur rubber asphalt binder composition is about 2% by weight crumb rubber material. In further embodiments, the sulfur rubber asphalt binder composition is about 3% by weight crumb rubber material. In further embodiments, the sulfur rubber asphalt binder composition is about 4% by weight crumb rubber material. In further embodiments, the sulfur rubber asphalt binder composition is about 5% by weight crumb rubber material. In further embodiments, the sulfur rubber asphalt binder composition is about 6% by weight crumb rubber material.

In a further embodiment, the asphalt is about 58% by weight, elemental sulfur is about 40% by weight, and the crumb rubber material is 2% by weight.

In another aspect, the invention provides for using the sulfur rubber asphalt binder composition to make an asphalt composition that also includes an aggregate material and a filler.

In further embodiments, the aggregate material is a gravel, sand, or stones. In some embodiments, the filler is a mineral filler.

The asphalt compositions of the present invention have improved properties over those of the base asphalt alone. For instance, in some embodiments, the asphalt composition has greater temperature resistance than that of the base asphalt alone. In further embodiments, the asphalt composition has improved waterproofing properties as compared to that of the base asphalt alone. In other embodiments, the asphalt composition has improved damp proofing properties as compared to that of the base asphalt alone.

The asphalt compositions described herein can be used for a number of different purposes, including applications where improved waterproofing and damp proofing are desired. In some embodiments, the asphalt composition is used in paving applications. In some embodiments, the asphalt composition is used in asphalt concrete pavement. In other embodiments, the asphalt is used in roofing applications. The asphalt compositions can be used in any applications where the use of a sulfur extended asphalt would be beneficial.

In another aspect, the invention provides for a method of making the sulfur rubber asphalt binder composition. The crumb rubber material is mixed with the base asphalt at a first predetermined temperature in a high shear blender for a first predetermined amount of time to create an asphalt crumb rubber mixture. The asphalt crumb rubber mixture is then placed in a sealed container in an oven at the first predetermined temperature for a second predetermined amount of time. The elemental sulfur is added to the asphalt crumb rubber mixture and mixed for a third predetermined amount of time at a second predetermined temperature such that intimate mixing of the elemental sulfur and the asphalt crumb mixture is achieved.

In some embodiments, the first predetermined temperature ranges from about 170° C. to about 190° C. In further embodiments, the first predetermined temperature is about 180° C. In the first predetermined temperature range, the crumb rubber typically swells.

In some embodiments, the second predetermined temperature ranges from about 140° C. to about 150° C. In further embodiments, the second predetermined temperature is about 145° C. In the second predetermined temperature range, the sulfur is blended with the asphalt.

In some embodiments, the first predetermined amount of time ranges from about 1 minute to 5 minutes. In further embodiments, the first predetermined amount of time is about 2 minutes. In the first predetermined amount of time, the crumb rubber is mixed with asphalt before it swells.

In some embodiments, the second predetermined amount of time ranges from about 90 minutes to 150 minutes. In further embodiments, the second predetermined amount of time is about 120 minutes. During the second predetermined amount of time, the crumb rubber typically swells.

In some embodiments, the third predetermined amount of time ranges from about 15 minutes to 25 minutes. In further embodiments, the third predetermined amount of time is about 20 minutes. In the third predetermined amount of time, sulfur is blended with the asphalt crumb mixture.

EXAMPLES

The following tests were carried out on various asphalt compositions as reported below. Penetration tests were conducted in accordance with ASTM D5, softening points tests were conducted in accordance with ASTM D36, and performance grading was conducted.

TABLE 1

Softening Points and Pentration Grade Analyses

| Sample # | Sample composition | Softening point (° C.) | Penetration grade |
|---|---|---|---|
| 1 | Pure asphalt | 52.4 | 52 |
| 2 | R 1%, S 40% and A 59% | 59.5 | 46.2 |
| 3 | R 2%, S 40% and A 58% | 65.5 | 44.3 |
| 4 | R 0%, S 40% and A 60% | 56.5 | 50.4 |
| 5 | R 0%, S 50% and A 50% | 60.3 | 48.5 |

S: Sulfur,
R: Crumb rubber,
A: Asphalt

The results of the softening point and penetration grade analyses are presented in Table 1. The results showed that the increase in rubber composition increased the softening point while decreasing the penetration grade. The increase in softening point indicated that the composition had greater temperature resistance and an increased range of applications. The increases in penetration grade increased the stiffness and also increased the range of applications.

TABLE 2

Performance Grades (PGs) for Pure Asphalt and Sulfur/Asphalt/Rubber Binder Compositions

| | Percentages of different components | | | |
|---|---|---|---|---|
| Sample # | Sulfur % | Asphalt % | Crumb rubber % | PG |
| 1 | 0 | 100 | 0 | 64-10 |
| 2 | 30 | 70 | 0 | 64-10 |
| 3 | 40 | 60 | 0 | 64-10 |
| 4 | 20 | 79 | 1 | 64-10 |
| 5 | 20 | 78 | 2 | 64-10 |
| 6 | 20 | 76 | 4 | 70-10 |
| 7 | 20 | 74 | 6 | 70-10 |
| 8 | 30 | 69 | 1 | 70-10 |
| 9 | 30 | 68 | 2 | 70-10 |
| 10 | 30 | 66 | 4 | 76-10 |

TABLE 2-continued

Performance Grades (PGs) for Pure Asphalt and Sulfur/Asphalt/Rubber Binder Compositions

| | Percentages of different components | | | |
|---|---|---|---|---|
| Sample # | Sulfur % | Asphalt % | Crumb rubber % | PG |
| 11 | 30 | 64 | 6 | 76-10 |
| 12 | 40 | 59 | 1 | 76-10 |
| 13 | 40 | 58 | 2 | 76-10 | binder had lower $G^*$ values as compared to base asphalt. However, the addition of crumb rubber to 30% by weight sulfur modified asphalt increased its complex modulus significantly.

Table 3 shows the values of complex modulus for 30% and 40% sulfur modified binder with 0%-6% rubber content for three different temperature levels. The values showed that increased rubber content increased the complex modulus of the modified binder. Additionally, the percentage increase in $G^*$ is higher at higher temperature, indicating that rubber increased the temperature resistance of the modified binder.

TABLE 3

Complex Modulus of 30% and 40% Sulfur Binder for Different Rubber Concentrations

| Sample # | Sample compositions | Complex modulus, $G^*$ (Pa) @ 67° C. | Percentage increase in $G^*$ | Complex modulus, $G^*$ (Pa) @ 73° C. | Percentage increase in $G^*$ | Complex modulus, $G^*$ (Pa) @ 79° C. | Percentage increase in $G^*$ |
|---|---|---|---|---|---|---|---|
| 1 | Pure Asphalt | 1121.51 | | 563.29 | | 295.11 | |
| 2 | 30% Sulfur, 70% Asphalt | 718.67 | -35.92 | 398.74 | -29.21 | 243.08 | -17.63 |
| 3 | 1% Rubber, 30% Sulfur, 69% Asphalt | 2225.52 | 72.88 | 1452.36 | 131.57 | 848.50 | 162.56 |
| 4 | 2% Rubber, 30% Sulfur, 68% Asphalt | 3056.92 | 137.47 | 1886.56 | 200.81 | 1021.30 | 216.03 |
| 5 | 4% Rubber, 30% Sulfur, 66% Asphalt | 3850.00 | 199.07 | 2390.43 | 281.15 | 1273.07 | 293.94 |
| 6 | 6% Rubber, 30% Sulfur, 64% Asphalt | 6290.02 | 388.62 | 3625.21 | 478.03 | 1899.08 | 487.65 |
| 7 | 40% Sulfur, 60% Asphalt | 968.47 | -13.65 | 630.60 | 11.95 | 419.12 | 42.02 |
| 8 | 1% Rubber, 40% Sulfur, 59% Asphalt | 1606.41 | 24.79 | 955.71 | 52.39 | 628.75 | 94.56 |
| 9 | 2% Rubber, 40% Sulfur, 58% Asphalt | 1852.46 | 43.90 | 1017.68 | 62.27 | 542.01 | 67.72 |
| 10 | 4% Rubber, 40% Sulfur, 56% Asphalt | 2244.69 | 74.37 | 1313.37 | 109.41 | 876.54 | 171.24 |
| 11 | 6% Rubber, 40% Sulfur, 54% Asphalt | 2626.82 | 104.06 | 1596.02 | 154.48 | 1080.70 | 234.41 |

TABLE 2-continued

Performance Grades (PGs) for Pure Asphalt and Sulfur/Asphalt/Rubber Binder Compositions

| | Percentages of different components | | | |
|---|---|---|---|---|
| Sample # | Sulfur % | Asphalt % | Crumb rubber % | PG |
| 14 | 40 | 56 | 4 | 76-10 |
| 15 | 40 | 54 | 6 | 82-10 |
| 16* | 50 | 49 | 1 | 76-10 |
| 17 | 50 | 48 | 2 | 76-10 |
| 18 | 50 | 46 | 4 | 82-10 |
| 19 | 50 | 44 | 6 | 88-10 |

Table 2 represents the Performance Grade (PG) test summary of pure asphalt and different sulfur/asphalt/rubber binder compositions. The PG test was performed in accordance with the Strategic Highway Research Program (SHRP) method AASHTO MP1-98. The data showed that sample number 16 had the greatest amount of sulfur content and the minimum amount of additive to achieve the PG76-10 rating. The result showed that an increase in sulfur content from 30% to 40% without additive did not result in a change of the PG. However, the addition of crumb rubber to the sulfur/asphalt samples increased PG, which in turn increased the temperature range of applications.

Figure 1:
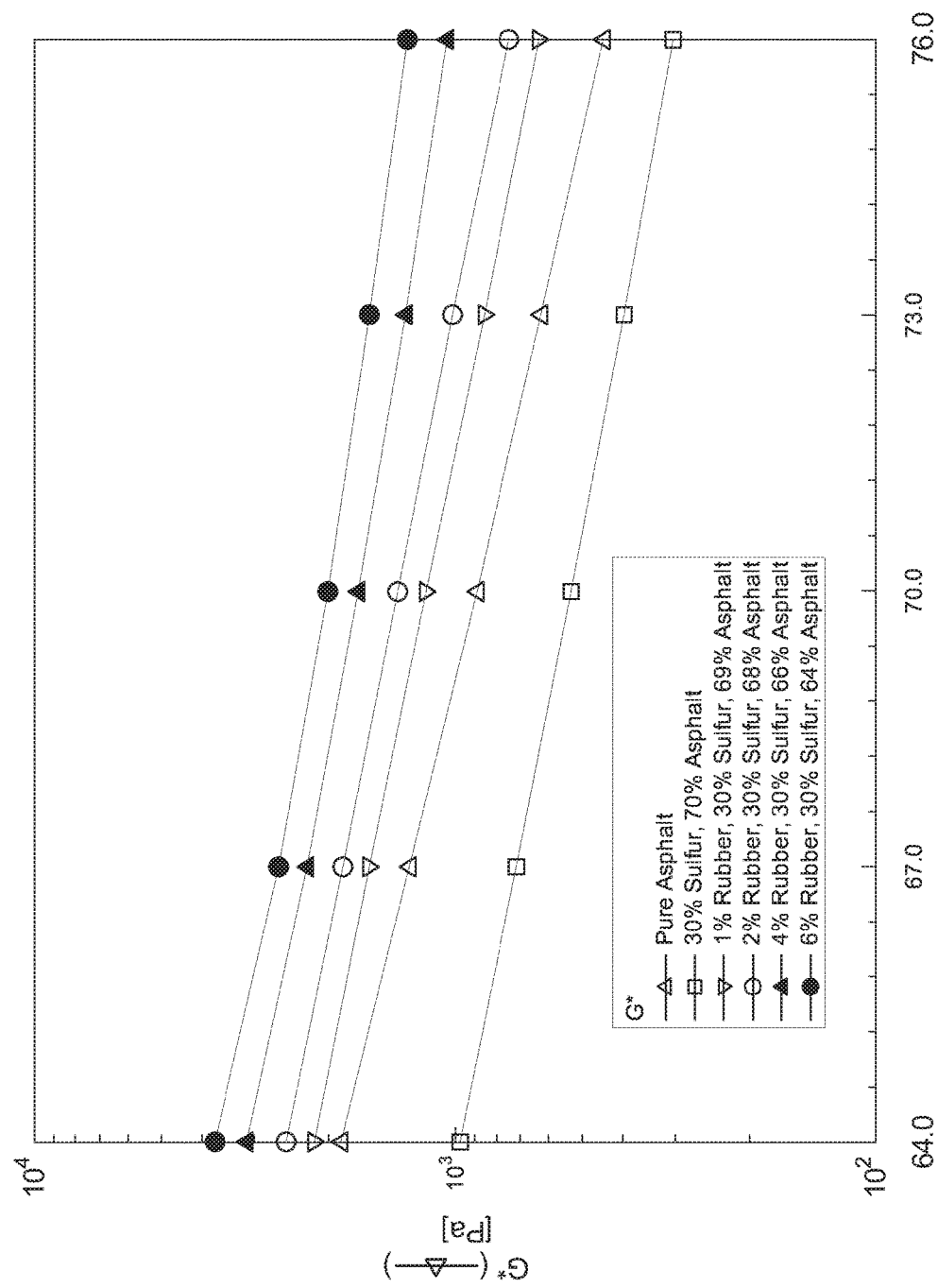
FIG. 1 shows the penetration grade test summary of sulfur/asphalt/crumb rubber binders.

FIG. 1 represents typical complex modulus ($G^*$) versus temperature (T) plot for 30% sulfur and 1%-6% rubber modifed binder. FIG. 1 indicates that a 30/70 sulfur asphalt The Marshall Stability values of the samples were calculated in accordance with ASTM D6927. Three samples for each of the designed compositions were tested to obtain an average stability value in kilonewtons (kN). The results showed that pure asphalt concrete compositions had the highest stability value at 20.38 kN. Increases in the sulfur content of the compositions decreased the stability of the compositions in general. All other compositions had stability values ranging from 15 kN to 20 kN. Increased sulfur content of the compositions generally decreased the stability of the compositions. The reason for the decrease in stability with sulfur content can be due to the free sulfur content of the compositions. The unbounded sulfur in the compositions will lead to a softening of the composition through water penetration during the two hours of conditioning in a water bath at 60° C. However, this decrease in stability was minimized through crumb rubber modification. The results of stability and designed compositions are shown in Table 4.

The resilient modulus (MR) is an important variable for the mechanistic design approaches to pavemented structures. It is the measure of pavement response in terms of dynamic stresses and corresponding resulting strains. The resilient modulus of hot mix asphalt (HMA) was assessed by applying diametral pulse loads to the samples. The load was applied in the vertical diametrical plane of a cylindrical specimen of 63.5-mm (height) by 101.6-mm (diameter). The samples were prepared using the Superpave compaction method. The resulting horizontal deformation of the specimens was measured and used to calculate the resilient modulus. The test was performed at 25° C. The pure asphalt concrete composition had the lowest MR value, while the sulfur modified asphalt concrete had improved resilient modulus compared to the other compositions. The modified compositions were stiffer than the plain compositions. The addition of sulfur resulted in increased stiffness and the addition of rubber increased the elasticity of the compositions, which increased the resilience of the compositions to dynamic loads as a result of the improvement in the binder elastic properties. The results are shown in Table 4.

The Indirect Tensile Strength (ITS) test (AASHTO T-245) was used to explore composition resistance to cracks development utilizing ITS. The ITS test was performed on cylindrical specimens of 63.5-mm height by 101.6-mm diameter. Samples were prepared for dry and wet ITS testing following exposure to the Superpave compaction method. The maximum load the specimen would carry before failure was determined (known as the ITS). The test was carried out at 25° C. for dry ITS specimens. Three samples were conditioned in a water bath at 60° C. for 24 hours and then put into a water bath at 25° C. for 2 hours. The samples were then tested for wet ITS. The durability was calculated using the ratio of the ITS of the conditioned specimen to the ITS of the unconditioned specimen. The results of the ITS test and durability are shown in Table 4.

Three compositions were selected for rutting (AASHTO TP 63-06) and fatigue resistance (AASHTO T321) testing. The rutting resistance of the selected samples was evaluated using the asphalt pavement analyzer (APA) at 64° C. The wheel load was set to 45.5 kg (100 lb.), and the wheel pressure was set to 689.5 kPa (100 psi), and there were 8000 load repetitions. 150 mm test samples were compacted using a gyratory compactor to the required density of 2550 to 2700 kg/m$^3$. The test samples were conditioned at the test temperature for 4 hours.

The results indicated that modified compositions had less rutting as compared to the pure asphalt concrete composition.

Table 2. The results of this additional test showed that a higher sulfur content in the binder required a smaller percentage of crumb rubber to achieve the same PG grade, as detailed in Table 5. The findings detailed in Table 5 are surprising and unexpected.

In summary, the crumb rubber sulfur asphalt compositions increased the MR compared to that of asphalt alone, increased the ITS of the compositions compared to that of asphalt alone, and increased the rutting resistance of the compositions as compared to that of asphalt alone.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of

TABLE 4

| Sample | Sulfur % | Asphalt % | Crumb rubber % | Stability KN | PG | M$_R$ MPa | Dry ITS, kPa | Wet ITS, kPa | Durability, % | Rutting mm |
|---|---|---|---|---|---|---|---|---|---|---|
| 1  |    | 100 | 0 | 20.38 | 64-10 | 5342.50 | 1260.93 | 769.44 | 61.02 | 6.23 |
| 2  | 20 | 76  | 4 | 19.13 | 70-10 | 7200.83 | 1434.02 | 1097.85 | 76.56 | 3.82 |
| 3  | 20 | 74  | 6 | 18.36 | 70-10 | 7341.75 | 1552.43 | 983.76 | 63.37 |  |
| 4  | 30 | 66  | 4 | 17.95 | 76-10 | 8129.50 | 1402.11 | 936.86 | 66.82 | 4.68 |
| 5  | 30 | 64  | 6 | 18.03 | 76-10 | 8635.33 | 1783.85 | 993.32 | 55.72 |  |
| 6  | 40 | 59  | 1 | 17.47 | 76-10 | 8547.42 | 1389.49 | 1157.31 | 83.29 |  |
| 7  | 40 | 58  | 2 | 16.18 | 76-10 | 6500.75 | 1315.23 | 869.95 | 66.14 |  |
| 8  | 50 | 49  | 1 | 17.06 | 76-10 | 11161.67 | 1462.93 | 1163.21 | 79.51 |  |
| 9  | 50 | 48  | 2 | 16.42 | 76-10 | 7526.42 | 1248.50 | 1041.48 | 83.41 |  |
| 10 | 50 | 46  | 4 | 15.67 | 82-10 | 7710.67 | 1443.66 | 483.03 | 33.46 |  |

TABLE 5

| Examples | Sulfur % | Asphalt % | Rubber % | PG |
|---|---|---|---|---|
| 1 | 0  | 100 | 0 | 64-10 |
| 2 | 30 | 70  | 0 | 64-10 |
| 3 | 40 | 60  | 0 | 64-10 |
| 4 | 20 | 76  | 4 | 70-10 |
| 5 | 30 | 66  | 4 | 76-10 |
| 6 | 40 | 56  | 4 | 76-10 |
| 7 | 50 | 46  | 4 | 82-10 |

An additional PG test was performed on seven additional samples according to the same parameters as the results in the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:
1. A sulfur rubber asphalt binder composition comprising:
a base asphalt,
elemental sulfur, and
a crumb rubber material, the crumb rubber is a recycled material, where the elemental sulfur is in a range of from about 30 to about 50 weight percent and the crumb rubber material is in a range of from about 1 to about 6 weight percent, each by weight of the sulfur rubber asphalt binder composition.

2. The composition of claim 1, where the sulfur rubber asphalt binder composition and the base asphalt each have a softening point temperature, and the softening point temperature for the sulfur rubber asphalt binder composition is greater than that of the base asphalt.

3. The composition of claim 1, where the sulfur rubber asphalt binder composition and the base asphalt each have a penetration grade value, and the penetration grade value for the sulfur rubber asphalt binder composition is less than that of the base asphalt.

4. The composition of claim 1, where the sulfur rubber asphalt binder composition and the base asphalt each have a Performance Grade temperature range, and the Performance Grade temperature range for the sulfur rubber asphalt binder composition is broader than that of the base asphalt.

5. The composition of claim 1, where the Performance Grade temperature range of the sulfur rubber asphalt binder composition is selected from the group consisting of group consisting of 70-10, 76-10, 82-10 and 88-10.

6. The composition of claim 1, where the sulfur rubber asphalt binder composition and the base asphalt each have a set of complex modulus ($G^*$) values associated with a range of temperature values, and where each $G^*$ value for the sulfur rubber asphalt binder composition is greater at each temperature value within the range of temperature than that of the base asphalt.

7. The composition of claim 6, where the range of temperature is from 64° C. to 76° C.

8. The composition of claim 1, where the composition is used in paving.

9. The composition of claim 1, where the composition is used in roofing.

10. An asphalt composition comprising the sulfur rubber asphalt binder composition of claim 1, an aggregate material and a filler.

11. The asphalt composition of claim 10, where the aggregate material is a gravel.

12. The asphalt composition of claim 10, where the filler is a mineral filler.

13. The asphalt composition of claim 10, where the composition is used in paving.

14. The asphalt composition of claim 10, where the composition is used in roofing.

* * * * *